Feb. 5, 1946.　　　B. G. HORSTMANN　　　2,394,384
DUAL CONTROL SYSTEM
Filed Dec. 15, 1942　　　2 Sheets-Sheet 1

INVENTOR
BEVAN G. HORSTMANN
BY
Herbert H. Thompson
HIS ATTORNEY

Feb. 5, 1946.  B. G. HORSTMANN  2,394,384
DUAL CONTROL SYSTEM
Filed Dec. 15, 1942  2 Sheets-Sheet 2

INVENTOR
BEVAN G. HORSTMANN
BY
Herbert H. Thompson
HIS ATTORNEY

Patented Feb. 5, 1946

2,394,384

UNITED STATES PATENT OFFICE 2,394,384

DUAL CONTROL SYSTEM

Bevan Graham Horstmann, Bath, England, assignor to The Sperry Gyroscope Company, Limited, Brentford, England, a British company Application December 15, 1942, Serial No. 469,133
In Great Britain July 21, 1941

3 Claims. (Cl. 74—407)

This invention relates to dual control systems, or systems in which a member to be driven can alternatively be driven from either of two driving members, and in which one of the said driving members acts as a master controller, in that, if it is operated, it controls the member to be driven irrespective of the manner in which the other driving member is operated. The two driving members may both be manually operated; alternatively, one or both may be operated by a servo-motor. The first alternative is of particular use in dual control apparatus in aircraft for training aviators, in which case the two driving members may be manually controlled by a pupil and an instructor respectively. The second alternative is of use where a craft is under automatic control, and the invention then provides an automatic control system comprising means for instantaneously superseding or over-riding the automatic control by manual control.

Usually such systems are concerned with rotary motion; therefore, for convenience of description, the invention is described in the terminology of rotary motion. This terminology, however, should not be considered as limiting, as the principles of the invention will readily be seen to be applicable to other types of motion, e. g. to motion in a straight line.

Subject to this understanding, the invention, in one aspect, consists in apparatus for use in dual control systems, or automatic control systems with over-riding manual control, wherein an output element is coupled mechanically to a first or normal input element and to a second or master input element in such manner that operation of the normal input shaft in either direction directly moves both the output element and the master input element provided that this movement is not resisted by a force operating on the master input element and exceeding a predetermined low threshold value, whereas, if the movement is resisted by such a force applied to the master input element, the normal input element is rendered ineffective to turn either the output element or the master input element, the coupling also being such that forces applied to the master input element in excess of the threshold force are made effective on the output element to cause or permit movement of the latter in the direction of the force so applied.

It will be evident that, if the normal input element were permanently locked, the device of the present invention would become one in which the master input element is the only input element, and that forces applied to this element would then drive the output element, whereas the output element would be locked against any forces applied to it other than through the master input element, because it would automatically become clutched to a fixed member as soon as the input element is left free from applied force. Devices of this kind are known, and they may be referred to as non-return drive or auto-lock devices.

It follows that, from one point of view, the present invention may be described as a novel application of such non-return drive devices, namely, to dual control systems, and consists in arranging that the fixed element of such a device, to which the output element is adapted to become clutched and locked, instead of being fixed, is rotatably mounted and is used as the means for applying the normal input to the dual control device whereas the master input of the dual control system is applied to the element that serves as the only input element of the non-return drive device.

According to the invention, a dual control system for aircraft of the kind comprising manual and automatic controls for a control surface of the aircraft, and wherein the automatic control includes a controlling instrument (e. g. a gyroscope) which causes a servo-motor to operate a control surface of the craft through the medium of a pick-off, is characterised by the insertion of a disengageable clutch between the servo-motor and the control surface; this clutch is under the control of the said manual control and the initial movement of the latter declutches the servo-motor from the control surface, whilst further movement actuates the control surface.

In a further aspect of the invention a disengageable clutch is inserted between the servo-motor and the control surface in a dual control system of the kind referred to in the previous paragraph, and is capable of being engaged and disengaged in any desired relative positions taken up by the control surface and the servo-motor.

One advantage of a dual control system according to the invention is that the automatic control system maintains an inclined attitude after this has once been set manually.

According to another aspect of the invention, a dual control system includes power transmission apparatus having first and second input elements and an output element, a pair of clutch devices carried by the output element and respectively capable of forming a clutching connection with the first input element to enable the latter to drive the output element in either direction, and means on the second input element co-operating with the clutch members to receive a drive in both directions from the first input element as and when the latter drives the output element, and to drive the output element and simultaneously declutch the same from the first input element, thus overriding any movement originating therein.

In greater detail, referring to a preferred embodiment, the output element and the first or normal input element are co-axially arranged and are normally clutched to each other through the pair of clutch devices so as to turn together as a single unit for movements originating in either member, and the means on the second or master input element control the clutch device by the angular position of the master control element relative to the output element. In its normal position the master control element leaves the clutch device between the normal input element and the output element fully operative. However, if a force in excess of the threshold value is applied to the master input element in either direction, it causes this element to turn in that direction relatively to the output element, and this relative movement, which may be quite small, e. g. only a small fraction of a degree, operates to declutch the normal input element from the output element; thereafter, if the master input element is rotated still further in the original direction of motion, it engages with the output element and the two turn together as a unit irrespective of the manner in which the normal input element is operated.

An embodiment of the invention will be described, by way of example, with the aid of the accompanying drawings, wherein.

Figure 1:
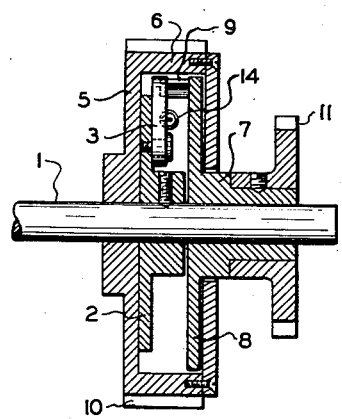
Figure 1 is a longitudinal section of the power transmission and clutching device.
Figure 2:
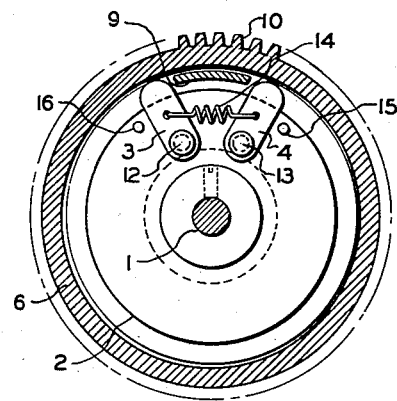
Figure 2 is a transverse section on the line II—II of Figure 1.

Referring particularly to Figures 1 and 2 of the drawings, the dual control system according to the invention includes a power transmission apparatus having the output element represented by the shaft 1 with which is formed or to which is fixedly mounted an annular flange 2 which carries a pair of clutch toggles 3 and 4 described later. A first input element, which is described herein as the normal input element, is shown as a member 5 rotatably mounted on the output shaft 1 and provided with a circular casing 6 surrounding the flange 2 with its toggles 3 and 4. A second input element, which is described herein as the master input element, is shown as a sleeve 7 rotatably mounted on the output shaft 1 and carrying a circular flange 8 to which is rigidly connected a striker 9 positioned between the toggles 3 and 4. The power inputs to the normal input element and the master input element respectively are indicated as being transmissible via the teeth 10 and 11 respectively on these elements.

The clutch toggles 3 and 4 are pivotally mounted on the flange 2 of the output element. The pivots 12 and 13 of the respective toggles 3 and 4 are so arranged that a radius drawn from the centre of the shaft 1 to the point of contact of the end of the toggles (where they engage the interior of the circular casing 6) is angularly offset from the pivot 12 or 13, the latter thus forming the elbow of the toggle. The vertices of the angles of the elbows 12 and 13 face one another and the toggles 3 and 4 are drawn together by a spring 14.

The toggles 3 and 4 may directly engage the input member 5 as shown or may be intermediary members operating clutching members proper.

In the illustrated form of the invention the two toggles 3 and 4 are brought into wedging relationship between the flange 2 and the casing 6 of the output shaft and normal input element respectively. A torque applied to the normal input in either direction wedges one or other of the toggles more firmly into engagement and the torque is therefore transmitted through the wedged member to the output shaft. The two toggles thus in this case constitute the clutch device.

These clutch toggles transmit the driving torque when the normal input element 5 drives the output shaft 1, the toggle 3 operating when the drive is clockwise and the toggle 4 when the normal input element drives the output shaft 1 anti-clockwise.

The centralising spring 14 operates on the displaceable toggles 3 and 4 to centralise them normally into a symmetrical position relative to the output shaft 1. The threshold value, referred to previously, of the force to be applied to the master input element 7, is then that force which, acting on the toggle member controlling the clutch will displace said member against the action of the centralising spring through a sufficient distance to control the declutching of the device that normally engages the input element 5 to the output shaft 1.

When power is applied to the master input element 7 to rotate the same in a clockwise direction, the striker 9 strikes the toggle 4 and moves it very slightly in a clockwise direction round its pivot 13 until it strikes a stop 15 on the flange 2. In this position the toggle is no longer in wedging engagement between the normal input casing 5 and the flange 2 of the output 1. Consequently if the master input element 7 is further rotated, this movement is imparted through the striker 9, toggle 4, stop 15 and flange 2, to the output shaft 1, but it is not imparted to the normal input casing 5. During this movement the toggle 3 trails and slides freely on the inside of the casing 5, and is not wedged. In this manner the master input element drives the output element and simultaneously declutches the normal input element from the output element. It will be clear that this engagement and disengagement of the clutch inserted between the normal input and the output can be effected by the striker 9 in any desired position of the output members 1 and 2 in relation to the positions of the normal input member 5.

If the master input element 7 is driven in the anti-clockwise direction, the striker 9 frees the toggle 3, preventing it from becoming wedged, and transmits the drive through toggle 3, stop 16, and flange 2 to the output, while the toggle 4 trails freely.

The invention may be used to provide a dual control system, not only in instructional or training aircraft, but also, with great advantage, in military aircraft. For this purpose, according to an aspect of the invention, controls operated by the pilot are connected to the control surfaces through dual control devices of the kind described in this specification, and the master control shafts of these devices are connected to auxiliary controls arranged for operation by the instructor in training aircraft, or by another member of the crew in military aircraft. If the pilot should be injured or lose consciousness the auxiliary control column can readily be operated by another member of the crew, irrespective of which has happened to the pilot's control column.

When the invention is used to provide an automatic control system with over-riding manual control, the automatic control arrangements are used to control the normal input shaft of a device of the kind described in this specification and the master control shaft is connected to a manual controller. The invention in this aspect consists in an automatic control system in which manual control can at any instant be applied to provide over-riding control of the control surface of the craft without there being any necessity to interrupt the automatic control arrangements or to by-pass the servo-motor or to apply forces appreciably in excess of those necessary if the automatic control is not switched on.

Figure 3:
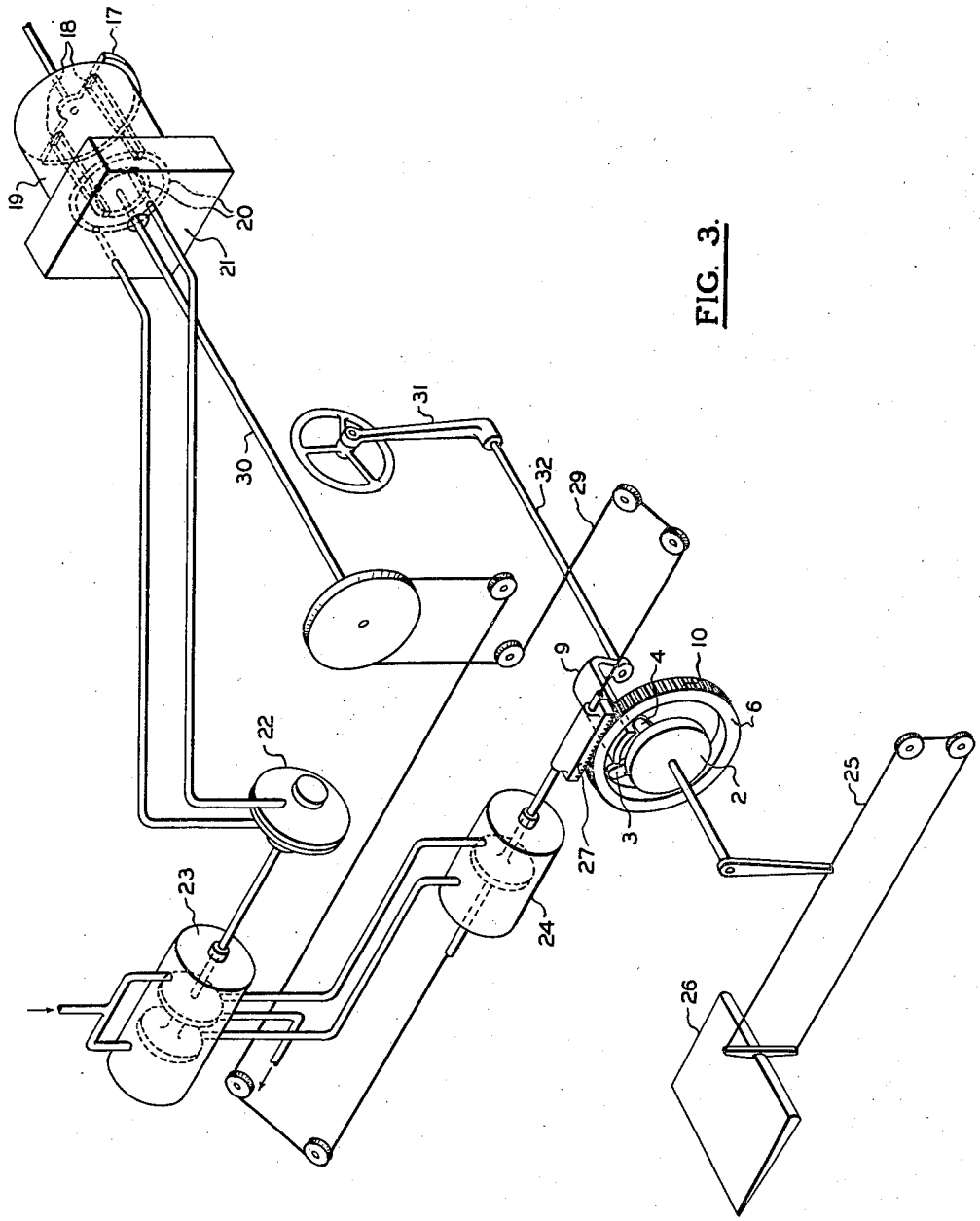

Referring to Figure 3, there is shown, in diagrammatic form, a system for operating a control surface of an aircraft under combined manual and automatic control. This particular system includes a repeat-back from the servo-motor to the pick-off of the automatic control, and also includes a transmission device and clutch as previously described providing inter alia a disengageable clutch between the servo-motor and the control surface.

In Figure 3 the numeral 17 designates a cut-off disc which is gyroscopically positioned to control the openings of the air pick-off ports 18 in the repeat-back member 19. The ports 18 in the member 19 (which for clearness is shown with a greatly exaggerated length) communicate with respective ducts 20 in the block 21. A casing (not shown) houses the gyroscope and the elements 17, 19 and 21, and this casing is maintained at sub-atmospheric pressure in order that air may be drawn in through appropriate passages and directed to spin the gyroscope.

The members 19 and 21 move with the casing in relation to the disc 17 as the aircraft tilts, and additionally the repeat-back member 19 with its ports 18 is adjustable in relation to the casing and block 21 by a repeat-back system described later.

When the areas of the openings of the respective pick-off ports 18 are unequal, causing deflection of the diaphragm of the air relay 22, said diaphragm moves the balanced oil valve 23. The valve 23 then permits oil to flow to one side of the servo unit 24, the piston of which is suitably connected to operate a control cable 25 for the control surface 26. For convenience of illustration a rack-and-pinion connection 27 is given as providing a drive from the servo unit 24 via the shaft 28 to the cable 25, but this is only one example of various operative connections which may be adopted.

The servo-motor 24 exerts a repeat-back action through the cable 29 and shaft 30 to actuate the pick-off device through the repeat-back member 19 and restore it, when the servo-motor operates, towards its neutral condition of alignment with the gyroscopically positioned cut-off disc 17 in which condition it ceases to energise the servo-motor to cause further movement.

The manual controller is represented by the control column 31 which operates the cable 25 and control surface 26 through the co-axial shafts 32 and 28. The transmission and clutch mechanism already described with reference to Figures 1 and 2 is indicated generally at C, where the rack of the rack-and-pinion 7 drives the normal input element 6 through the pinion teeth 18, and the said normal input element 6 drives the output shaft 28 through the clutch toggles 3 and 4 and flange 2 all as previously described. Also, the shaft 32 (constituting a master input shaft) actuates the striker 9 of the master input element.

The automatic control system for aircraft shown in Figure 3 has a novel and important property. It will be clear from the preceding description that this automatic control system includes means for instantaneously superseding or over-riding the automatic control by manual control, the latter being able to disengage the clutch between the servo unit and the control surface, and to re-engage the clutch after any desired relative displacement has been brought about between the servo unit and the control surface. The novel result obtained in this system is that if over-riding manual control is taken, and the craft thereby set manually into a new attitude, the automatic control system thereafter automatically maintains the new attitude thus set. This result is obtained by virtue of the fact that the automatic control system automatically sets on the pick-off an attitude corresponding to that in which the craft has been set manually. In explanation of these statements it must first be pointed out that in automatic control systems a new attitude of the craft can be set by displacing the pick-off relatively to the aircraft. This is usually effected by a manual control knob which acts through a differential in the repeat-back connection (e. g. 29, 30) to the pick-off. If the pick-off is displaced, the automatic control system is set into operation to turn the craft until the pick-off comes back into line with the gyroscope, the craft being then in an inclined attitude. The automatic control system thereafter controls the craft to maintain the pick-off in line with the gyroscope, i. e. to maintain the craft in the new inclined position. In the system according to Figure 3 no setting knob is necessary for setting the attitude of the aircraft by adjusting the pick-off.

In order to demonstrate this, I assume, for simplicity of explanation, that the control surface is the elevator, and that the system illustrated is one for controlling the elevator to correct pitch movements of the craft. When the aircraft is pitched upwards by means of the manual control, the first effect of the tilting of the aircraft is that the pick-off device 19 becomes pitched upwards relatively to the cut-off disc 17 attached to the gyro-horizon with the result that the diaphragm of the relay 22 is deflected and the relay valve 23 sets the servomotor 24 into operation. The servo-motor has no effect on the control column or the elevator, as over-riding manual control is being exerted, and it therefore merely runs to pitch the pick-off 19 downwards relatively to the upwardly-pitched craft until it becomes aligned again with the cut-off disc 17. Thus, the system of Figure 3 automatically adjusts itself, when a climb is produced by means of the control column, to set the same angle of climb by displacing the pick-off 19 relatively to the craft. The securing of this result depends on the fact that the follow-back connection 29, 30 for operating the pick-off device is connected to be operated by the servo-motor itself and not by the control surface.

The invention does not necessarily depend upon connecting the repeat-back from the servo-motor side of the clutch, but can alternatively be put into effect with a repeat-back from any element of the system on the output side of the clutch, e. g. from the control surface itself. In that case the results just referred to are not obtained. Instead, if over-riding manual control has been taken and the aircraft set manually into an inclined attitude, after which the manual control is released, the automatic control system will bring the aircraft back to the attitude it had originally. In such a system, if it is desired that the automatic control system should be capable of automatically controlling the aircraft to fly in an inclined attitude, it will be necessary to provide manual setting means for turning the pick-off relatively to the craft, these control means operating, e. g., through a differential in the repeat-back connection, in the manner already referred to.

Automatic control systems of the kind shown in Figure 3 are usually brought into operation by a master control valve, which connects the source of pressure to the servo-motor or else blocks a by-pass connection across the servo-motor. In the system of Figure 3 the method of putting the automatic control system into operation is very simple. The master control valve is switched on while the pilot merely retains manual control of the aircraft to hold the aircraft for a short interval in the attitude in which he desires the automatic control system to maintain the craft thereafter. As there is no attitude setting knob, it is not possible, as in some previous automatic control systems, for the pilot by an oversight to engage the automatic control system with the attitude setting knobs displaced, with the result that when the automatic control system is engaged it operates to throw the aircraft violently and unexpectedly into the inclined attitude thereby set.

Figure 4:
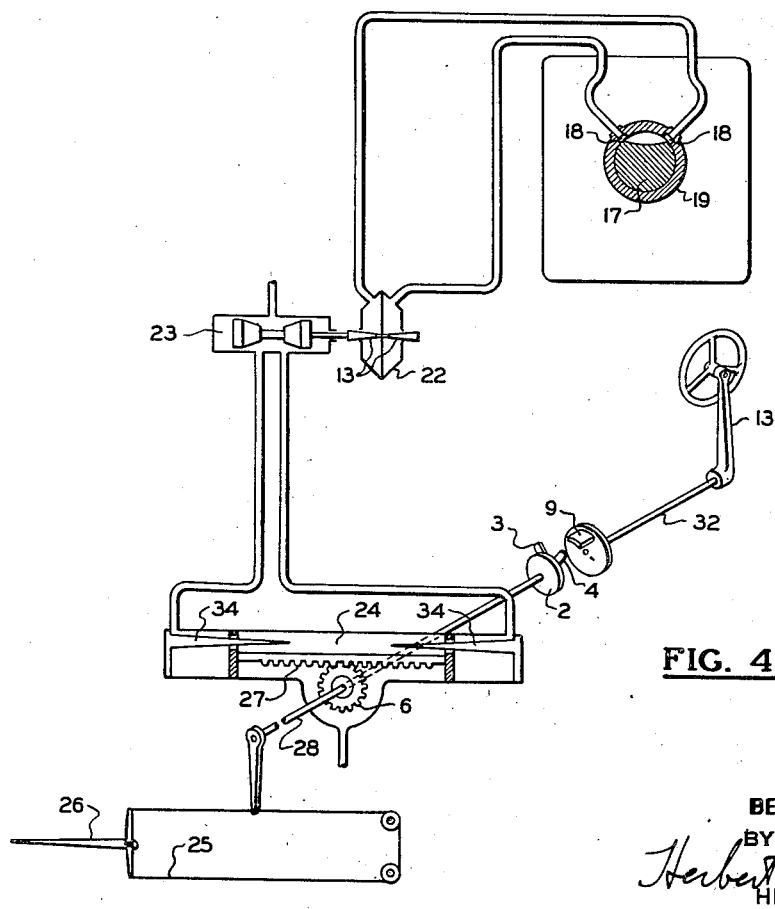
Figures 3 and 4 are diagrams showing different forms of a combined automatic and manually controlled system for aircraft according to the invention.

Referring to Figure 4 there is shown, in diagrammatic form, another system for operating a control surface of an aircraft under combined manual and automatic control. Numerals of reference similar to those used in the other figures indicate the same or corresponding parts. This system is an example of a proportionally acting type (or progressive control type) of automatic control. That is to say the difference of pressure produced at the pick-off ports 18 varies progressively with the extent of the displacement of the pick-off member 19 relative to the cut-off disc 17 throughout the range of normal movement of the aircraft taking place during automatic control, and the movement of the diaphragm 22 varies progressively with the magnitude of this difference of pressure. Similarly the difference of pressure in the pipes leading from the relay valve 23 to the servo-motor 24 varies progressively with the extent of the displacement of the relay valve produced by the diaphragm, and the resultant movement of the servo-motor varies progressively with the magnitude of this difference of pressure. In the system of Figure 4 this result is attained firstly by employing ports 18 having a sufficient circumferential opening; secondly by providing valves 33 operated by movement of the diaphragm which modify the air-flow producing the pressure difference effect in the air relay 22; thirdly by arranging that the ports in the relay valve leading to the servo-motor are never completely shut during normal working conditions; and fourthly by providing needle valves 34 operated by movement of the servo-motor which modify the flow of pressure fluid to the two sides of the servo piston, the fluid escaping through the needle valves to exhaust.

The power transmission and clutch device is diagrammatically represented in Figure 4 by certain skeleton elements thereof, viz.: striker 9 on the master input shaft 32, toggles 3 and 4 on the flange 2 of the output shaft 28, and the normal input element, 6.

In Figure 4, therefore, there is a further case where an aircraft has an automatic control system and means for instantaneously superseding or over-riding the automatic control by manual control, the latter being able to disengage the clutch between the servo unit and the control surface. In this system no repeat-back is employed, but by reason of the proportional nature of the control, proportionality is still ensured between inclination of the aircraft and movement of the servo-motor, just as this result is obtained in Figure 3 by the use of a repeat-back from the servo-motor. However, it is precisely by virtue of this proportionality in Figure 3, in conjunction with the use of the disengageable clutch between the servo-motor and the control surface, that the novel result is obtained that has already been asserted concerning the system of Figure 3, namely that, when over-riding manual control is taken and the aircraft is thereby manually placed into a new attitude, the automatic control system will thereafter maintain the craft in the new attitude. It follows that this result is also obtained in the system of Figure 4, even although there is no repeat-back in this system.

I claim:

1. In a dual control device, a multi-part clutch having an output member carrying rigidly mounted stops, a normal control member, disengageable connecting means between said output member and said normal control member for normally connecting the same, and a master control member including means for disengaging said disengageable means and causing the same to contact said stops, and separate means for driving each of said control members.

2. In a dual control system, a clutching device comprising an output shaft, an input drum, a member fixed to said output shaft having a plurality of spring biased wedging members and fixed stops mounted thereon, said wedging members cooperating with said input drum, an input member having a striker mounted thereon for engaging said wedging members and causing the same to act against said stops, said striker acting to release said wedging members to give driving control to said input member when input drive is assumed thereby.

3. In a dual control system, a rotatable output member having an annular flange fixed thereto, a normal input member rotatably mounted on said output member and having a casing shoulder to envelope said flange of said output member, a plurality of surface engaging elements pivotally mounted on said annular flange to engage said casing portion of said input member, a master input element rotatably mounted on said output member, and a connecting striker carried on said master input element to interspace said pivotally mounted surface engaging elements to thereby release same when control is assumed by said master input element.

BEVAN GRAHAM HORSTMANN.